Patented Apr. 23, 1929.

1,710,100

UNITED STATES PATENT OFFICE.

JOHN J. MORIARTY, OF TORONTO, ONTARIO, CANADA, ASSIGNOR OF THIRTY PER CENT TO JAMES H. S. KERR, OF TORONTO, CANADA.

RUBBER RECLAMATION PROCESS.

No Drawing. Application filed December 8, 1927. Serial No. 238,722.

This invention relates to a process of reclaiming vulcanized rubber and my object is to devise a process which will materially reduce both the time and labor involved in the process and which will result in the production of a larger amount of usable finished material from a given amount of raw material.

The stock or raw material employed usually contains in addition to the vulcanized rubber a considerable amount of cotton or other cellulose fibre and the purpose of a reclamation process is to destroy the fibre and to remove more or less of the free or combined sulphur of the rubber.

In carrying out my process I first, in order to facilitate the subsequent steps of the process, soften the stock by subjecting it to the action of moist heat. This may be effected by subjecting it to the action of steam at a pressure of fifty pounds for two or three hours in an ordinary de-vulcanizer.

The stock is then run through a grinder to reduce it to a fine state of division.

The finely divided stock is then mixed with any suitable material to give it sufficient plasticity for milling. Preferably I employ the bituminous material known as mineral rubber and incorporate 30% by weight of this with the stock on the mill, or enough to bring the stock to a state of continuity on the mill.

While the stock is in sheet form on the mill, I sprinkle it with a suitable reclamation re-agent. Preferably I employ approximately 5% by weight of a 20% solution of sulphuric acid. Milling is continued till a substantially homogeneous mass is produced with the acid intimately mingled with the rubber and contained fibre.

The mass is then removed from the mill in sheet form and placed in a de-vulcanizer for about four hours and subjected to the action of steam at a pressure of about sixty-five pounds. The sheets are then removed, thoroughly milled, and any free acid left neutralized by milling in a suitable alkali such as aniline oil or lime. The sheets may then be refined and strained as is usual in all reclamation processes.

The result is a product which contains substantially all the original fibre, but in a broken down and harmless condition, and the added mineral rubber. The final product is thus of greater bulk than the original rubber stock and possesses qualities valuable in most uses of reclaimed rubber.

As the time consumed in the treatment is only that of the ordinary reclamation processes, the cost per unit of original rubber stock is greatly reduced and, as the weight of the final product is much greater relative to the stock treated than the final product of ordinary processes, the cost per unit of the finished product relative to ordinary reclaimed rubber is still further reduced.

If the rubber to be reclaimed contains little or no fibre, a lesser quantity of the reclamation re-agent is necessary and the proper quantity can readily be ascertained by experiment.

While sulphuric acid will usually be employed, an alkaline reclamation re-agent may be substituted, but with the probable effect of increasing the time required for re-action.

What I claim is:

1. A process of reclaiming fiberized and vulcanized rubber which includes the following steps, *a* grinding the stock, *b* incorporating therewith a plasticizing ingredient, *c* milling the plasticized stock and incorporating therewith during and by the milling process a sufficient quantity of a reclaiming re-agent, *d* and subjecting the stock to the action of steam under pressure.

2. A process of reclaiming fiberized and vulcanized rubber which includes the following steps, *a* grinding the stock, *b* incorporating therewith a plasticizing ingredient, *c* milling the plasticized stock and intimately incorporating therewith during and by the milling sufficient dilute sulphuric acid to substantially hydrolyze the fibre, *d* and subjecting the stock to the action of steam under pressure.

3. A process of reclaiming fiberized and vulcanized rubber which includes the following steps *a* grinding the stock, *b* incorporating therewith a sufficient quantity of mineral rubber to plasticize the mass, *c* milling the plasticized stock and incorporating therewith during and by the milling process a sufficient quantity of a reclaiming re-agent, *d* and subjecting the stock to the action of steam under pressure.

4. A process of reclaiming fiberized and vulcanized rubber which includes the following steps, *a* softening the stock by the application of moist heat, *b* grinding the stock, *c* incorporating therewith a plasticizing ingredient, *d* milling the plasticized stock and incorporating therewith during and by the milling process a sufficient quantity of a reclaiming re-agent, e and subjecting the stock to the action of steam under pressure.

5. A process of reclaiming fiberized and vulcanized rubber which includes the following steps, a softening the stock by the application of moist heat, b grinding the stock, c incorporating therewith a sufficient quantity of mineral rubber to plasticize the mass, d milling the plasticized stock and incorporating therewith during and by the milling process a sufficient quantity of a reclaiming re-agent, e and subjecting the stock to the action of steam under pressure.

6. A process of reclaiming fiberized and vulcanized rubber which includes the following steps, a grinding the stock, b incorporating therewith a plasticizing ingredient, c milling the plasticized stock and intimately incorporating therewith during and by the milling sufficient dilute sulphuric acid to substantially hydrolyze the fibre, d subjecting the stock to the action of steam under pressure, e and subsequently neutralizing any free acid remaining in the mass.

7. A process of reclaiming fiberized and vulcanized rubber which includes the following steps, a grinding the stock, b incorporating therewith a plasticizing ingredient, c milling the plasticized stock and intimately incorporating therewith during and by the milling sufficient dilute sulphuric acid to substantially hydrolyze the fibre, d subjecting the stock to the action of steam under pressure, e and subsequently neutralizing any free acid remaining in the mass by the addition of aniline oil.

8. A process of reclaiming fiberized and vulcanized rubber which includes the following steps, a grinding the stock, b incorporating therewith a sufficient quantity of mineral rubber to plasticize the mass, c milling the plasticized stock and intimately incorporating therewith during and by the milling sufficient dilute sulphuric acid to substantially hydrolyze the fibre, d and subjecting the stock to the action of steam under pressure.

9. A process of reclaiming fiberized and vulcanized rubber which includes the following steps a softening the stock by the application of moist heat, b grinding the stock, c incorporating therewith a plasticizing ingredient, d milling the plasticized stock and intimately incorporating therewith during and by the milling sufficient dilute sulphuric acid to substantially hydrolyze the fibre, e and subjecting the stock to the action of steam under pressure.

10. A process of reclaiming fiberized and vulcanized rubber which includes the following steps, a softening the stock by the application of moist heat, b grinding the stock, c incorporating therewith a sufficient quantity of mineral rubber to plasticize the mass, d milling the plasticized stock and intimately incorporating therewith during and by the milling sufficient dilute sulphuric acid to substantially hydrolyze the fibre, e and subjecting the stock to the action of steam under pressure.

11. A process of reclaiming fiberized and vulcanized rubber which consists in a softening the stock by subjecting it to the action of steam under pressure, b incorporating therewith approximately 30% by weight of a hydrocarbon plasticizer, c milling the plasticized stock and intimately incorporating therewith during and by the milling process approximately 5% of a 20% sulphuric acid solution, d subjecting the stock to the action of steam under pressure until devulcanized.

Signed at Toronto, Canada, this 3rd day of December, 1927.

JOHN J. MORIARTY.